United States Patent
Marsh et al.

(10) Patent No.: US 9,140,349 B1
(45) Date of Patent: Sep. 22, 2015

(54) COMPACT AXLE ASSEMBLY WITH LOCKING DIFFERENTIAL

(71) Applicant: American Axle & Manufacturing, Inc., Detroit, MI (US)

(72) Inventors: Gregory A. Marsh, Ferndale, MI (US); Matthew T. Blakeman, South Rockwood, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/529,449

(22) Filed: Oct. 31, 2014

Related U.S. Application Data (60) Provisional application No. 61/983,092, filed on Apr. 23, 2014.

(51) Int. Cl.
| | |
|---|---|
| F16H 48/24 | (2006.01) |
| F16H 48/34 | (2012.01) |
| F16H 48/11 | (2012.01) |
| F16H 48/10 | (2012.01) |
| F16H 48/20 | (2012.01) |

(52) U.S. Cl.
CPC ............... *F16H 48/24* (2013.01); *F16H 48/11* (2013.01); *F16H 48/34* (2013.01); *F16H 2048/106* (2013.01); *F16H 2048/201* (2013.01)

(58) Field of Classification Search
None
See application file for complete search history.

(56) References Cited

U.S. PATENT DOCUMENTS

| | | | |
|---|---|---|---|
| 1,786,492 A * | 12/1930 | Hustvet ..................... | 475/237 |
| 1,888,884 A * | 11/1932 | Omer et al. ............... | 475/237 |
| 2,742,684 A * | 4/1956 | Rising et al. .............. | 475/237 |
| 4,043,224 A * | 8/1977 | Quick ....................... | 475/237 |
| 5,540,300 A | 7/1996 | Downs et al. | |
| 5,839,327 A | 11/1998 | Gage | |
| 6,155,135 A | 12/2000 | Gage et al. | |
| 6,398,689 B1 | 6/2002 | Morse et al. | |
| 6,533,697 B2 | 3/2003 | Morse et al. | |
| 6,634,978 B2 * | 10/2003 | Banno et al. .............. | 475/222 |
| 6,958,030 B2 | 10/2005 | DeGowske | |
| 7,022,041 B2 | 4/2006 | Valente | |
| 7,108,428 B2 | 9/2006 | Ason et al. | |
| 7,175,560 B2 | 2/2007 | Petruska et al. | |
| 7,201,696 B2 | 4/2007 | DeGowske | |
| 7,211,020 B2 | 5/2007 | Gohl et al | |
| 7,282,006 B2 | 10/2007 | Petruska et al. | |
| 7,572,202 B2 | 8/2009 | Donofrio et al. | |
| 7,585,032 B2 | 9/2009 | Seeds et al. | |
| 7,775,928 B2 | 8/2010 | Zink | |

(Continued)

*Primary Examiner* — Ramya Burgess
*Assistant Examiner* — Mark Manley
(74) *Attorney, Agent, or Firm* — Harness, Dickey & Pierce, P.L.C.

(57) ABSTRACT

An axle assembly having a carrier housing, a locking differential assembly, a pair of differential bearing and an actuator assembly. The carrier housing includes a cavity. The locking differential assembly includes a differential case that is received in the cavity. The differential case includes a bearing bore into which an outer race of the differential bearing is received. The actuator assembly includes a sleeve that is movable between a first sleeve position, which is configured to cause the locking differential assembly to operate in an unlocked mode, and a second sleeve position that is configured to cause the locking differential assembly to operate in a locked mode. The sleeve is at least partly radially in-line with the differential bearing when the sleeve is in the first and/or second sleeve positions such that a plane taken perpendicular to the axis extends through both the sleeve and the differential bearing.

19 Claims, 10 Drawing Sheets

(56) References Cited

U.S. PATENT DOCUMENTS

| | | |
|---|---|---|
| 7,837,588 B2 | 11/2010 | Valente |
| 7,931,557 B2 | 4/2011 | Zink |
| 7,998,012 B2 | 8/2011 | Zink |
| 8,109,000 B2 | 2/2012 | Zalanca et al. |
| 8,109,174 B2 | 2/2012 | Hilker et al. |
| 8,152,672 B2 * | 4/2012 | King et al. .................. 475/84 |
| 8,167,758 B2 | 5/2012 | Downs et al. |
| 8,167,762 B2 | 5/2012 | Zink et al. |
| 8,460,149 B1 | 6/2013 | Chemelli et al. |
| 8,475,320 B2 | 7/2013 | Kwon |
| 8,512,193 B1 | 8/2013 | Hilker et al. |
| 8,534,925 B1 | 9/2013 | Stambek |
| 8,657,716 B1 | 2/2014 | Whyte et al. |
| 8,684,876 B2 | 4/2014 | Corless et al. |
| 2004/0142786 A1 * | 7/2004 | Fusegi et al. .................. 475/231 |
| 2006/0276298 A1 * | 12/2006 | Rodgers et al. .................. 475/231 |
| 2009/0048056 A1 * | 2/2009 | McVea et al. .................. 475/249 |
| 2011/0269595 A1 | 11/2011 | Marsh et al. |
| 2012/0283060 A1 | 11/2012 | Birdsall, III |
| 2014/0260789 A1 | 9/2014 | Zalanca et al. |

\* cited by examiner

COMPACT AXLE ASSEMBLY WITH LOCKING DIFFERENTIAL

CROSS-REFERENCE TO RELATED APPLICATIONS

This application claims the benefit of U.S. Provisional Application No. 61/983,092, filed on Apr. 23, 2014, the disclosure of which is incorporated by reference as if set forth in its entirety herein.

FIELD

The present disclosure relates to a compact axle assembly with a locking differential assembly.

BACKGROUND

This section provides background information related to the present disclosure which is not necessarily prior art.

In the field of off-roading, beam axle assemblies are perceived as providing advantages over other axle assembly types when operating in certain types of terrain, such as when rock crawling. These advantages include the perception of increased durability and the articulation of the axle assembly when traversing uneven terrain so that the position of the differential can be shifted as a function of the position of the axle wheels so as to better avoid contact between the ground/an obstruction and the portion of the axle assembly that houses the differential. While the known beam axle assemblies are satisfactory for their intended use, there nevertheless remains a need in the art for an improved beam axle.

For example, axle assemblies for use in off-roading typically employ a locking differential assembly to inhibit speed differentiation between the wheels of an axle assembly. In the known beam axles configurations, the locking mechanisms of the known locking differential assemblies typically increase the width of the center section of the axle housing. As will be appreciated, any increase in size of the center section of the axle housing creates an increased risk that the axle assembly will contact an obstruction when operating a vehicle in off-road conditions.

SUMMARY

This section provides a general summary of the disclosure, and is not a comprehensive disclosure of its full scope or all of its features.

In one form, the present disclosure provides an axle assembly with an axle housing, a locking differential assembly, a cover and an actuator assembly. The axle housing has a center section that defines a cavity. The locking differential assembly is received in the cavity for rotation about an axis and has a differential case, first and second output members, and a locking element that is movably mounted to the differential case. The cover is mounted to the center section to partly close an open side of the cavity. The cover defines an actuator aperture that provides access through the cover to the cavity. The actuator assembly includes a sleeve and an actuator. The sleeve is mounted on the differential case and is movable along the axis between a first sleeve position and a second sleeve position. The actuator is mounted to an exterior side of the cover and extends through the actuator aperture to engage the sleeve. The actuator is configured to selectively move the sleeve between the first and second sleeve positions. The locking differential assembly is configured to operate in an unlocked mode that permits speed differentiation between the first and second output members when the sleeve is in the first sleeve position. The locking differential assembly is configured to be operated in a locked mode that inhibits speed differentiation between the first and second output members when the sleeve is in the second sleeve position.

In another form, the present disclosure provides an axle assembly with an axle housing, a locking differential assembly, a differential bearing and an actuator assembly. The axle housing has a center section that defines a cavity. The locking differential assembly is received in the cavity and includes a differential case, first and second output members, and a locking element that is movably mounted to the differential case. The differential case defines a bearing bore. The differential bearing has an outer bearing race that is received in the bearing bore and engaged to the differential case. The differential bearing supports an end of the locking differential assembly for rotation about an axis relative to the axle housing. The actuator assembly has a sleeve and an actuator. The sleeve is mounted on the differential case and is movable along the axis between a first sleeve position and a second sleeve position. The actuator is coupled to the axle housing and engages the sleeve. The actuator is configured to selectively move the sleeve between the first and second sleeve positions. The locking differential assembly is configured to operate in an unlocked mode that permits speed differentiation between the first and second output members when the sleeve is in the first sleeve position. The locking differential assembly is configured to operate in a locked mode that inhibits speed differentiation between the first and second output members when the sleeve is in the second sleeve position. At least a portion of the sleeve is radially in-line with at least a portion of the differential bearing when the sleeve is in at least one of the first and second sleeve positions such that a plane taken perpendicular to the axis extends through both the sleeve and the differential bearing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
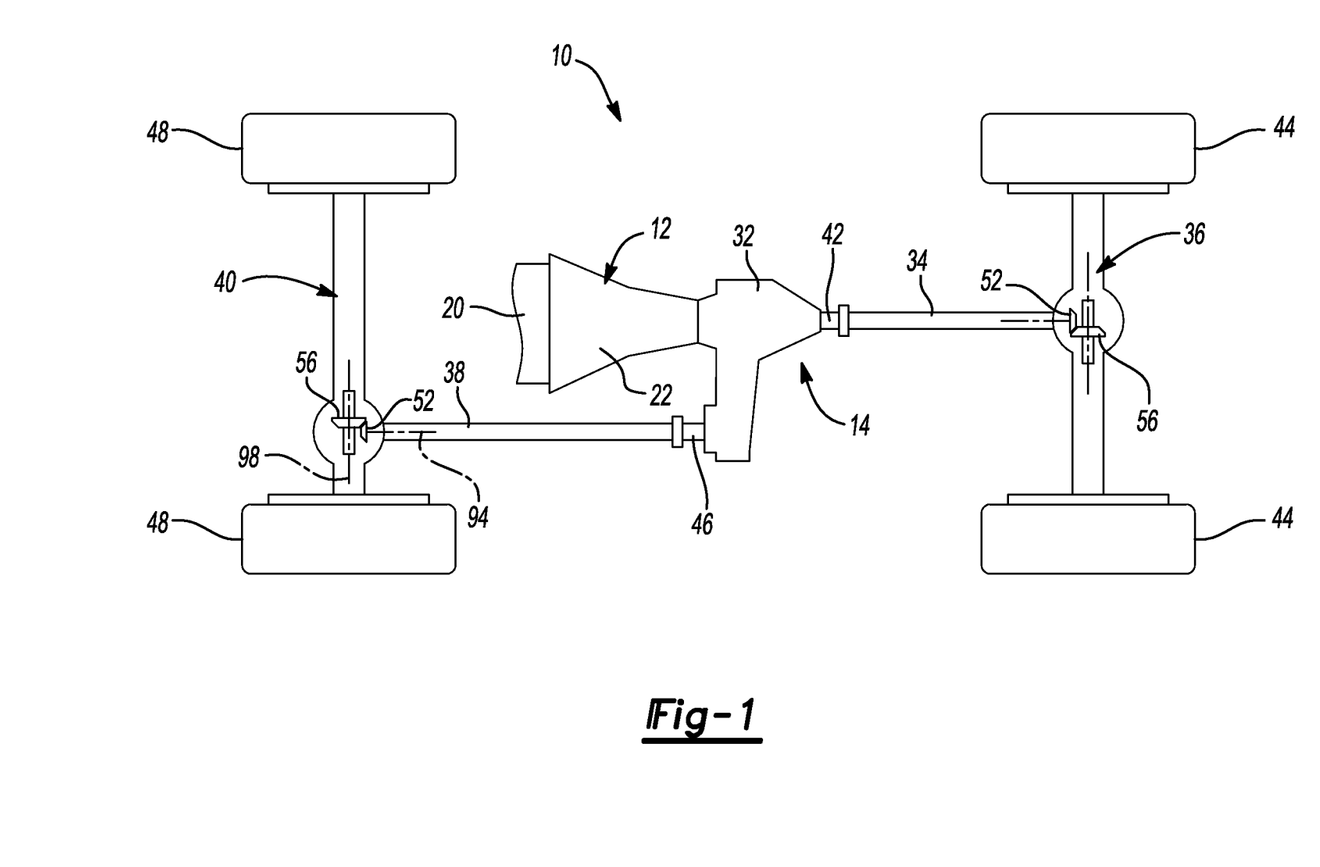
FIG. 1 is a schematic illustration of a vehicle having exemplary axle assemblies constructed in accordance with the teachings of the present disclosure.

With reference to FIG. 1 of the drawings, an exemplary vehicle 10 is illustrated to include a powertrain 12 and a drivetrain 14. The powertrain 12 can include a prime mover 20 and a transmission 22. The prime mover 20 can be an internal combustion engine or an electric motor and can be configured to provide rotary power to the transmission 22. The transmission 22 can be any type of transmission, such as a manual, automatic or continuously variable transmission, and can be configured to provide rotary power to the drivetrain 14.

The drivetrain 14 can include a transfer case 32, a rear propshaft 34, a rear axle assembly 36, a front propshaft 38 and a front axle assembly 40. The transfer case 32 can receive rotary power from the transmission 22. The rear propshaft 34 can be drivingly coupled to a rear output 42 of the transfer case 32 and can transmit rotary power to the rear axle assembly 36. The rear axle assembly 36 can be configured to transmit rotary power to a set of rear vehicle wheels 44. The front propshaft 38 can be drivingly coupled to a front output 46 of the transfer case 32 and can transmit rotary power to the front axle assembly 40. The front axle assembly 40 can be configured to transmit rotary power to a set of front vehicle wheels 48. The rear and front axle assemblies 36 and 40 can be constructed in accordance with the teachings of the present disclosure. As the front axle assembly 40 is generally similar to the rear axle assembly 36, only the rear axle assembly 36 will be discussed in detail herein.

Figure 2:
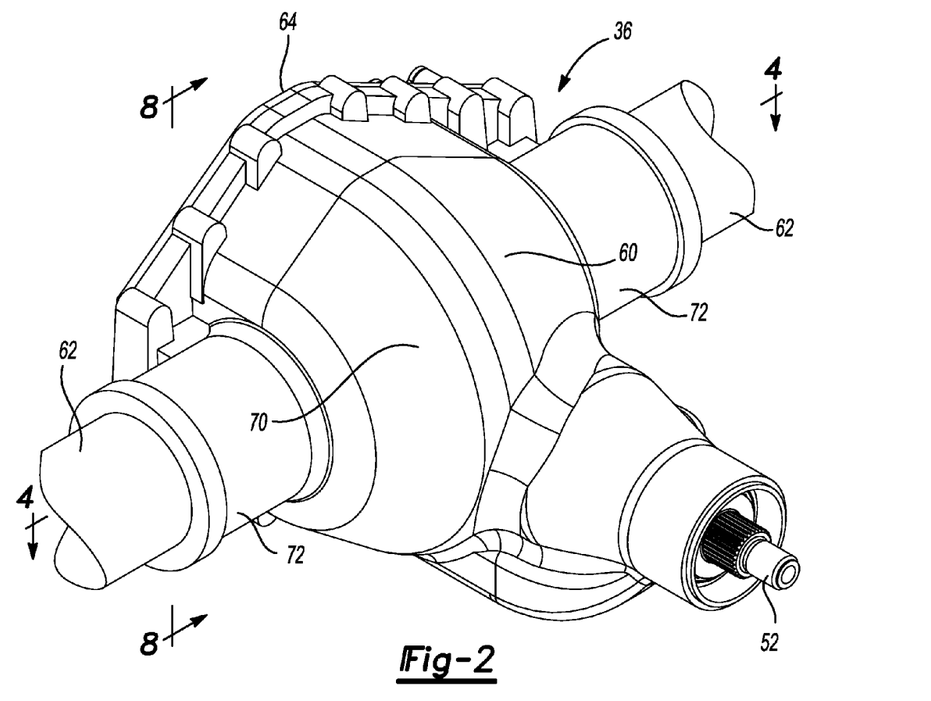
FIG. 2 is a bottom perspective view of a portion of the vehicle of FIG. 1, illustrating the rear axle assembly in more detail.
Figure 3:
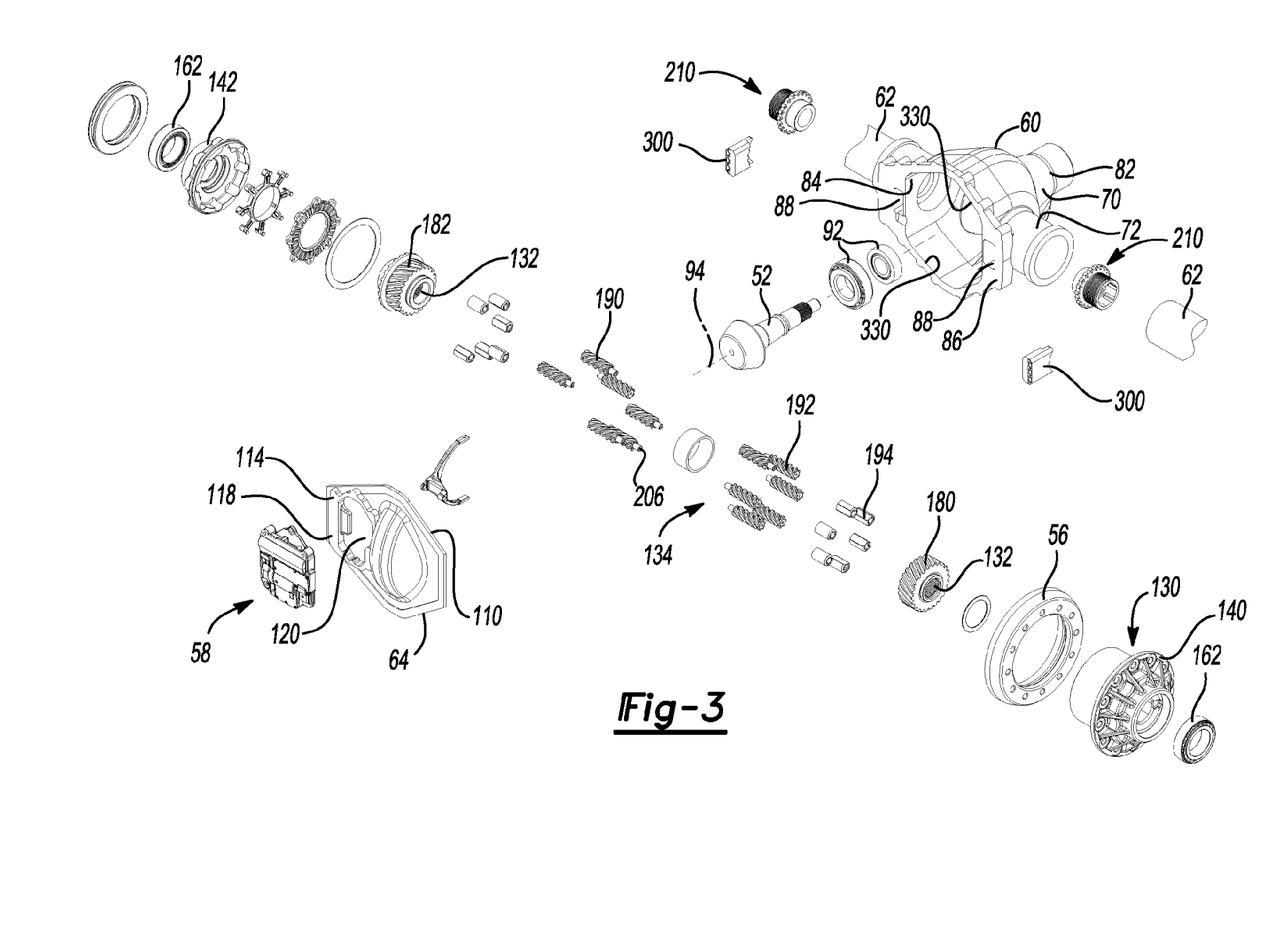
FIG. 3 is an exploded bottom perspective view of the rear axle assembly.

With reference to FIGS. 2 and 3, the rear axle assembly 36 is shown in more detail. The rear axle assembly 36 can include a housing assembly 50, an input pinion 52, a differential assembly 54, a ring gear 56 and a locking mechanism 58.

The housing assembly 50 can comprise a carrier housing 60, a pair of axle tubes 62 and a housing cover 64. The carrier housing 60 can be formed of any suitable material, such as an A206 aluminum alloy material (e.g., 206-T4, 206-T7), and can define a body portion 70 and a pair of tube mounts 72.

Figure 4:
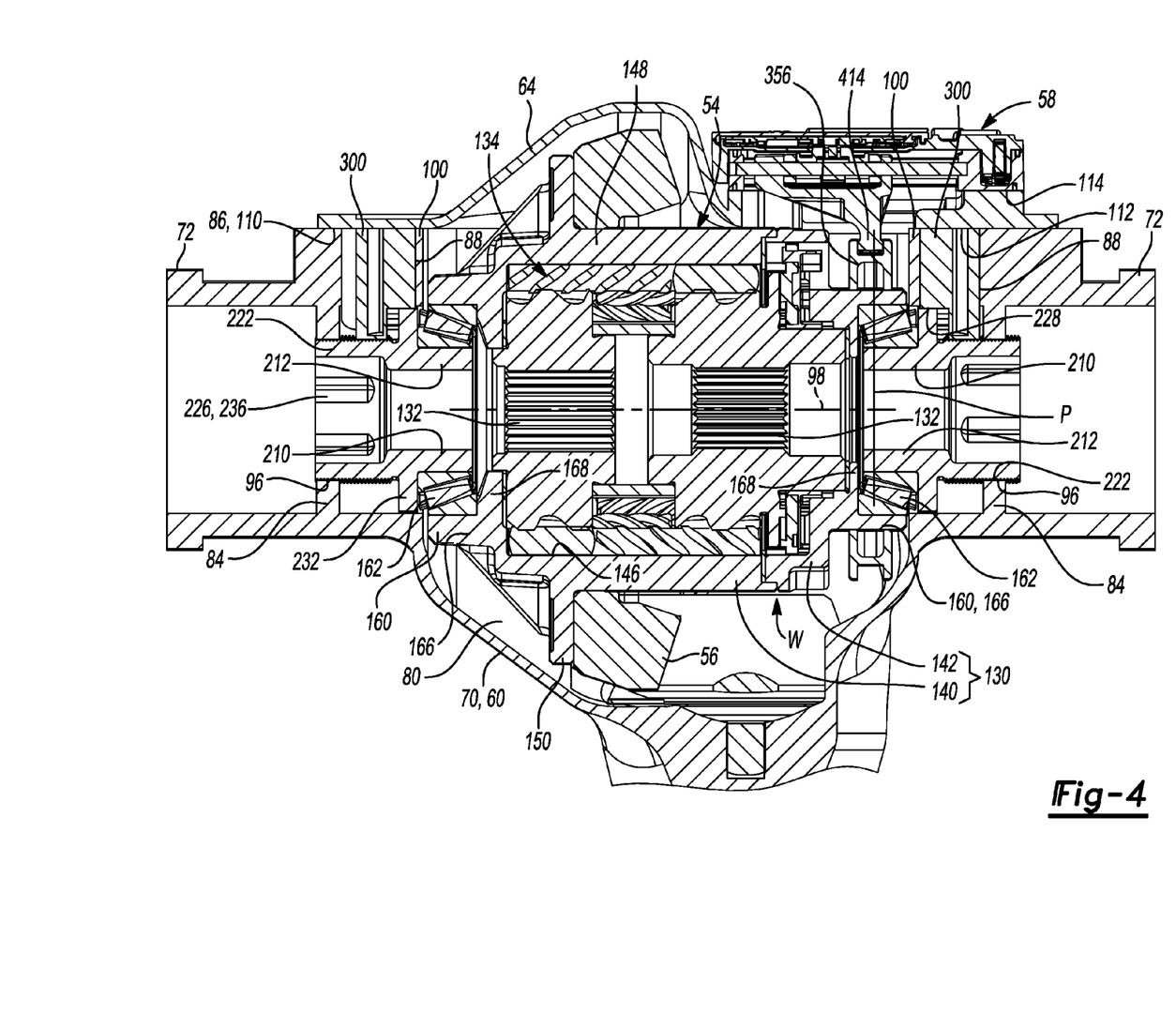
FIG. 4 is a section view of a portion of the rear axle assembly taken along the line 4-4 of FIG. 2.

With reference to FIGS. 3 and 4, the body portion 70 can define a cavity 80 that is configured to receive the differential assembly 54 therein. The body portion 70 can include a pinion mount portion 82, a pair of bulkheads 84, a first flange 86 and a pair of lock mounts 88. The pinion mount portion 82 is configured to receive a pair of pinion bearings 92 that support a shaft portion of the input pinion 52 for rotation about a first axis 94 relative to the carrier housing 60. Each of the bulkheads 84 can be unitarily and integrally formed with a remainder of the carrier housing 60 such that they cannot be removed from the remainder of the carrier housing 60. Each of the bulkheads 84 can define a threaded aperture 96 that can be disposed about a second axis 98 concentrically with an associated one of the tube mounts 72. The first flange 86 is configured to cooperate with the housing cover 64 to close the cavity 80 and as such, the first flange 86 can generally extend about the perimeter of the cavity 80. In the example provided, the first flange 86 also extends about the lock mounts 88. Each of the lock mounts 88 can define a recess that can extend through the first flange 86 at a location between an associated one of the bulkheads 84 and the cavity 80. In the particular example provided, an intermediate wall 100 on the first flange 86 separates each of lock mounts 88 from the cavity 80, but it will be appreciated that the recesses defined by the lock mounts 88 could intersect the portion of the cavity 80 that is formed through the first flange 86.

The tube mounts 72 can be disposed on opposite lateral sides of the body portion 70 and each of the tube mounts 72 can be configured to receive an associated one of the axle tubes 62, for example in a press-fit manner. If desired, the axle tubes 62 can be secured to the tube mounts 72 in a manner that inhibits axial movement of the axle tubes 62 relative to the tube mounts 72, such as slug welding.

The housing cover 64 can be removably coupled to the body portion 70 of the carrier housing 60 to substantially close the cavity 80 that is formed in the body portion 70. The housing cover 64 can define a second flange 110, a pair of abutment members 112 and an actuator mount 114. The second flange 110 can be configured to cooperate with the first flange 86 on the body portion 70 to form a sealing interface. It will be appreciated that a gasket (not specifically shown) or sealant material can be received between the first and second flanges 86 and 110 to a form a seal therebetween. The abutment members 112 can be shaped in any desired manner and can be disposed in-line with the lock mounts 88 when the housing cover 64 is installed to the carrier housing 60. In the example provided, the abutment members 112 are co-formed with the second flange 110 such that the portions of the inner surface of the housing cover 64 that are defined by the second flange 110 and the abutment members 112 are co-planar. It will be appreciated, however, that the abutment members 112 may be shaped differently and that they may extend on one side or the other of the plane that is defined by the inside surface of the second flange 110. The actuator mount 114 can define a mounting flange 118 that can border an actuator aperture 120 that extends through the housing cover 64 and is configured to provide a means for portion of the locking mechanism 58 to access structure that is mounted in the cavity 80. A portion of the locking mechanism 58 can be secured to the housing cover 64 via the actuator mount 114 as will be described in greater detail, below.

The differential assembly 54 can include a differential case assembly 130, a pair of output members 132 and a power transmitting means 134. The output members 132 are rotatably disposed about the second axis 98 and can be drivingly coupled to a pair of axle shafts (not specifically shown).

Figure 5:
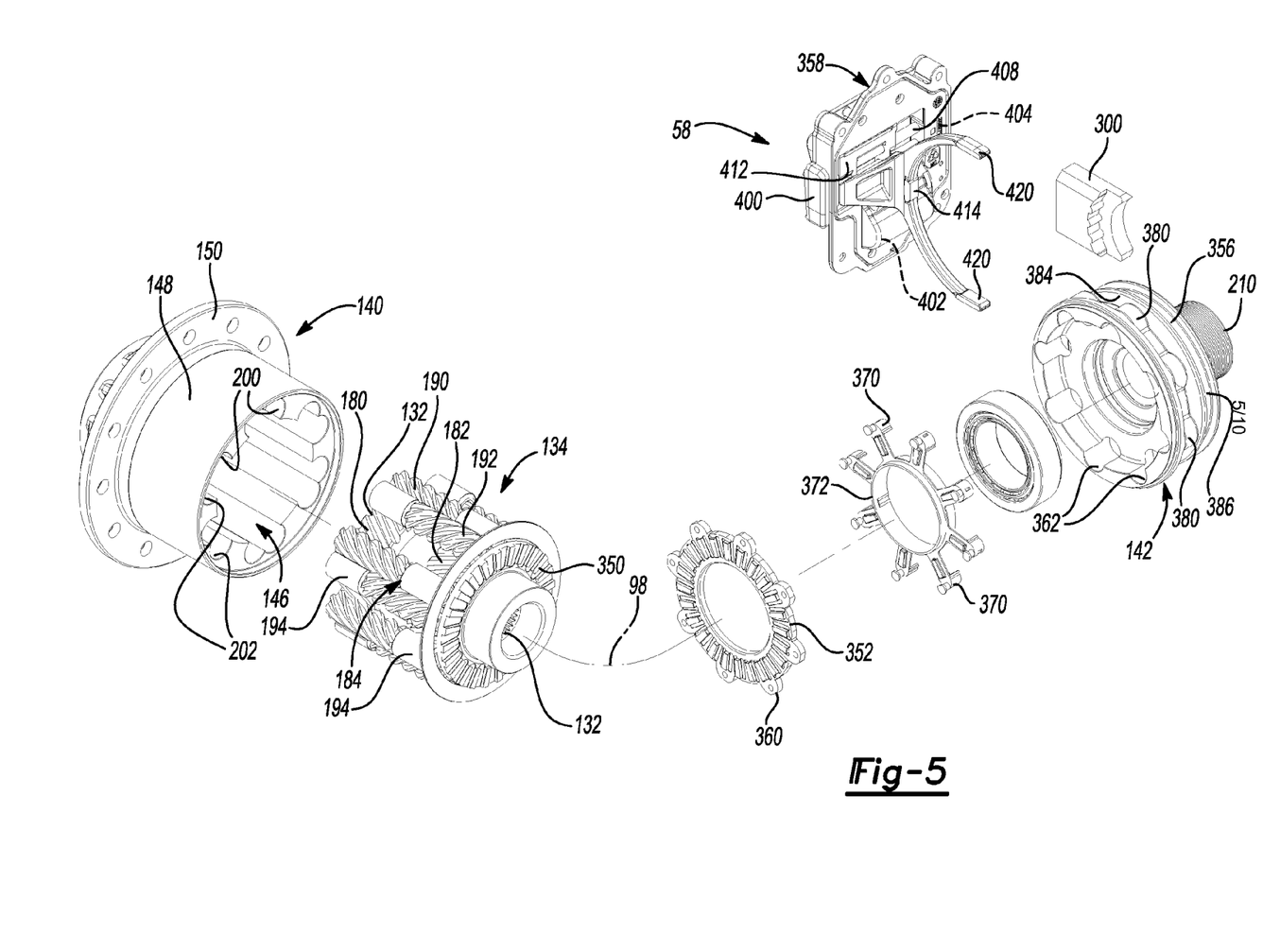
FIG. 5 is an exploded perspective view of a portion of the rear axle assembly illustrating a portion of the differential assembly and the locking mechanism in more detail.

With reference to FIGS. 4 and 5, the differential case assembly 130 can include a case body 140 and a cap 142 that can be fixedly coupled to one another by any desired means, including threaded fasteners. In the particular example provided, the cap 142 is welded to the case body 140. The case body 140 and the cap 142 can cooperate to define a differential cavity 146 into which the output members 132, a portion of the locking mechanism 58, and the power transmitting means 134 can be received. The case body 140 can include an annular case wall 148, which is sized to be received through the ring gear 56, and a flange member 150 that can extend radially outwardly from the case wall 148. The ring gear 56 can be mounted to the flange member 150 in any desired manner, such as via a plurality of threaded fasteners or via welding, and can be meshingly engaged with the input pinion 52 (FIG. 3). In the particular example provided, the ring gear 56 and the input pinion 52 (FIG. 3) are oriented in the carrier housing 60 to form a "high offset" hypoid gearset in which the first axis 94 is located vertically above the second axis 98.

As best shown in FIG. 4, the case body 140 and the cap 142 can define bearing mounts 160 for a pair of differential bearings 162. In the particular example provided, each of the bearing mounts 160 is formed by counterbores that are formed into the annular wall member 148 and the cap 142. The counterbores define an outer annular wall 166 and a shoulder 168. The counterbores receive the differential bearings 162 such that the outer bearing race of each of the differential bearings 162 is engaged to the outer annular wall 166 and abutted against the shoulder 168 of a corresponding one of the counterbores. Construction of the differential case assembly 130 in this manner (i.e., with inverted differential bearings) reduces the width of the differential case assembly 130 as compared with a conventionally constructed and mounted differential case construction.

With reference to FIGS. 3 and 5, the power transmitting means 134 can be any type of device or mechanism for transmitting rotary power between the differential case assembly 130 and the output members 132, and can comprise one or more clutches and/or a differential gearset. In the example provided, the power transmitting means 134 comprises a differential gearset having first and second helical side gears 180 and 182 and a plurality of differential pinion sets 184. The first and second helical side gears 180 and 182 can be received in the differential cavity 146 and can be coupled to the output members 132 for common rotation about the second axis 98. The differential gearset can be configured with any number of differential pinion sets 184, but in the particular example provided, the differential gearset includes six (6) differential pinion sets 184. Each differential pinion set 184 can have a first differential pinion 190, a second differential pinion 192, and a pair of brake shoes 194. The first differential pinions 190 can be received into first pinion cavity portions 200 of the differential cavity 146 and can have helical teeth that can be meshingly engaged with the teeth of the first helical side gear 180. The second differential pinions 192 can be received into second pinion cavity portions 202 of the differential cavity 146. Each of the second differential pinions 192 can have helical teeth that can be meshingly engaged with the teeth of the second helical side gear 182 as well as the teeth of a corresponding one of the first differential pinions 190. Each of the brake shoes 194 can be received on a shaft end 206 (FIG. 3) of a corresponding one of the first and second differential pinions 190 and 192 and can be received in an associated one of the first and second cavity portions 200 and 202 so as to non-rotatably engage the case body 140 or the cap 142.

It will be appreciated that welding of the cap 142 to the case body 140 could produce distortions in the case body 140 that could impact the engagement of the first and second differential pinions 190 and 192 with the surfaces of the first and second cavity portions 200 and 202, respectively. In the particular example provided, the weld W (FIG. 3) between the cap 142 and the case body 140 is axially offset and radially outward from the first and second cavity portions 200 and 202 so as to reduce the risk of distortion induced by the welding of the cap 142 to the case body 140.

Figure 6:
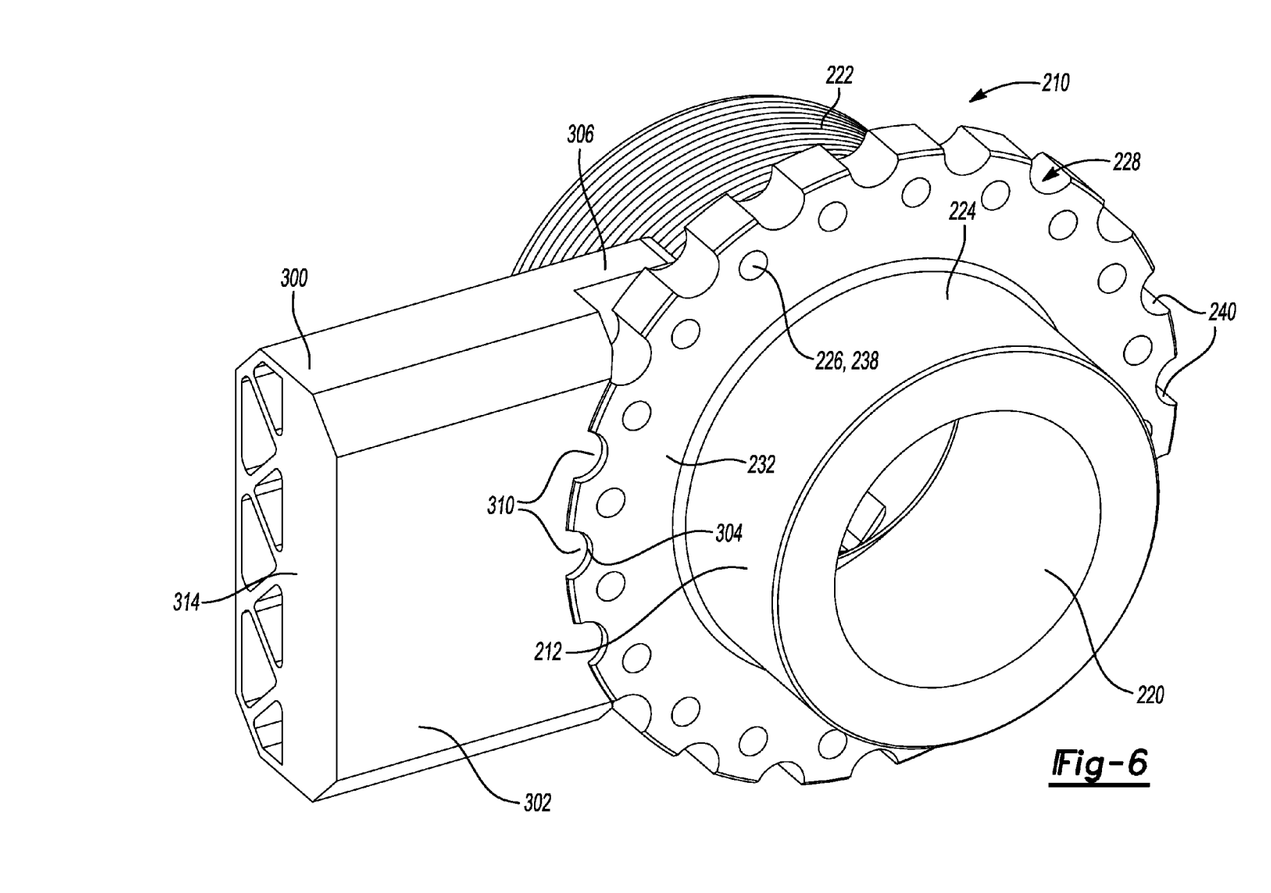
FIG. 6 is a perspective view of a portion of the rear axle assembly illustrating a differential bearing adjuster and an adjuster lock in more detail.

With reference to FIGS. 4 and 6, a pair of differential bearing adjusters 210 can be employed to provide journals 212 onto which the differential case assembly 130 can rotate relative to the carrier housing 60, as well as to both pre-load the differential bearings 162 and to position the differential case assembly 130 in a lateral direction to thereby effect the meshing of the ring gear 56 to the input pinion 52 (FIG. 3). Each of the differential bearing adjusters 210 can define a central aperture 220, which can extend longitudinally through the differential bearing adjuster 210, a housing engagement portion 222, a bearing engaging portion 224, a tool engaging portion 226 and a locking portion 228. The housing engagement portion 222 can comprise an externally threaded segment that can be threadably engaged to the threaded aperture 96 in a corresponding one of the bulkheads 84 in the body portion 70 of the carrier housing 60. The bearing engaging portion 224 can comprise the journal 212, which is configured to engage the inner bearing race of an associated one of the differential bearings 162, and a shoulder 232 that is configured to abut the inner bearing race of the associated one of the differential bearings 162. The tool engaging portion 226 is configured to engage a tool (not shown) to permit a technician to rotate the differential bearing adjuster 210 relative to the carrier housing 60. In the particular example provided, the tool engaging portion 226 comprises a hexagonal aperture 236, which is coincident with a portion of the central aperture 220 and is configured to drivingly engage a correspondingly shaped tool, and a plurality of holes 238 that can be spaced circumferentially about the shoulder 232 radially outwardly of the housing engagement portion 222. The former tool engaging means may be suited for high volume production prior to the installation of the axle shafts (not specifically shown), whereas the latter tool engaging means may be suited for repair or service. It will be appreciated, however, that redundant tool engagement means need not be provided, and the tool engagement means provided by the tool engaging portion 226 could be shaped differently. The locking portion 228 can comprise a plurality of circumferentially spaced-apart locking features 240 that can be disposed about the circumference of the differential bearing adjuster 210. In the particular example provided, the locking features 240 are shaped in a negative manner (i.e., the locking features 240 are defined by material that is removed from or not present in a portion of the differential bearing adjuster 210) in which each of the locking features 240 is a groove that extends generally parallel to a longitudinal axis of the differential bearing adjuster 210. However, those of skill in the art will appreciate that the locking features 240 could be shaped in a positive manner (i.e., the locking features 240 can be defined by material that is present on a portion of the differential bearing adjuster 210). The locking portion 228 can be located axially along the length of the differential bearing adjuster 210 so as to be positioned in-line with one of the lock mounts 88 in the carrier housing 60 when the differential assembly 54 is mounted to the carrier housing 60 and positioned laterally relative to the carrier housing 60 in a desired manner.

Figure 7:
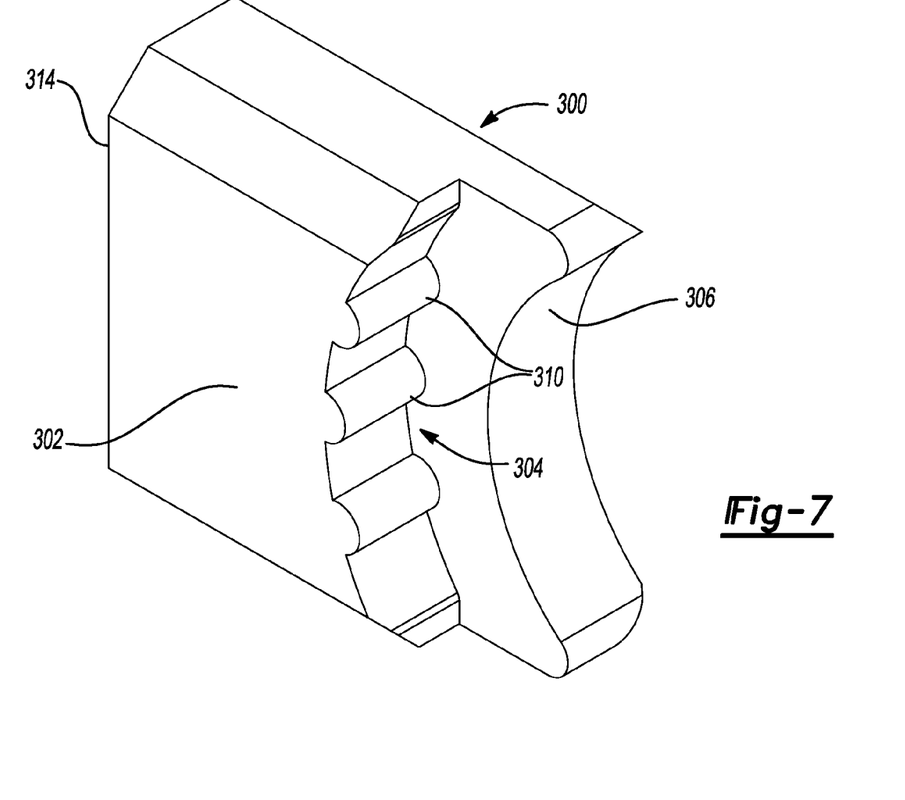
FIG. 7 is a perspective view of the adjuster lock.

With reference to FIGS. 4, 6 and 7, a pair of adjuster locks 300 can be employed to inhibit rotation of the differential bearing adjusters 210 relative to the carrier housing 60. Each of the adjuster locks 300 can be formed of a suitable material, such as a plastic or powdered metal material, and can have a lock body 302, a locking profile 304 and a lock flange 306. The lock body 302 is configured to be slidably received into the recess of a corresponding one of the lock mounts 88 (FIG. 3) so that the adjuster lock 300 is maintained in a predetermined position relative to the carrier housing 60. The locking profile 304 can be configured to engage the differential bearing adjusters 210 to inhibit rotational movement of a corresponding one of the differential bearing adjusters 210 relative to the carrier housing 60. The locking profile 304 can comprise mating locking features 310 that can engage a portion of the locking features 240 on the corresponding one of the differential bearing adjusters 210. In the example provided, the locking profile 304 comprises a plurality of spline members that are configured to be received into a sub-set of the locking features 240 that are aligned to the lock mounts 88. The lock flange 306 can be sized and positioned to contact the shoulder 232 on the differential bearing adjuster 210 to prevent the adjuster lock 300 from being fully inserted into the carrier housing 60 if the differential bearing adjuster 210 is not positioned within predefined limits.

Figure 8:
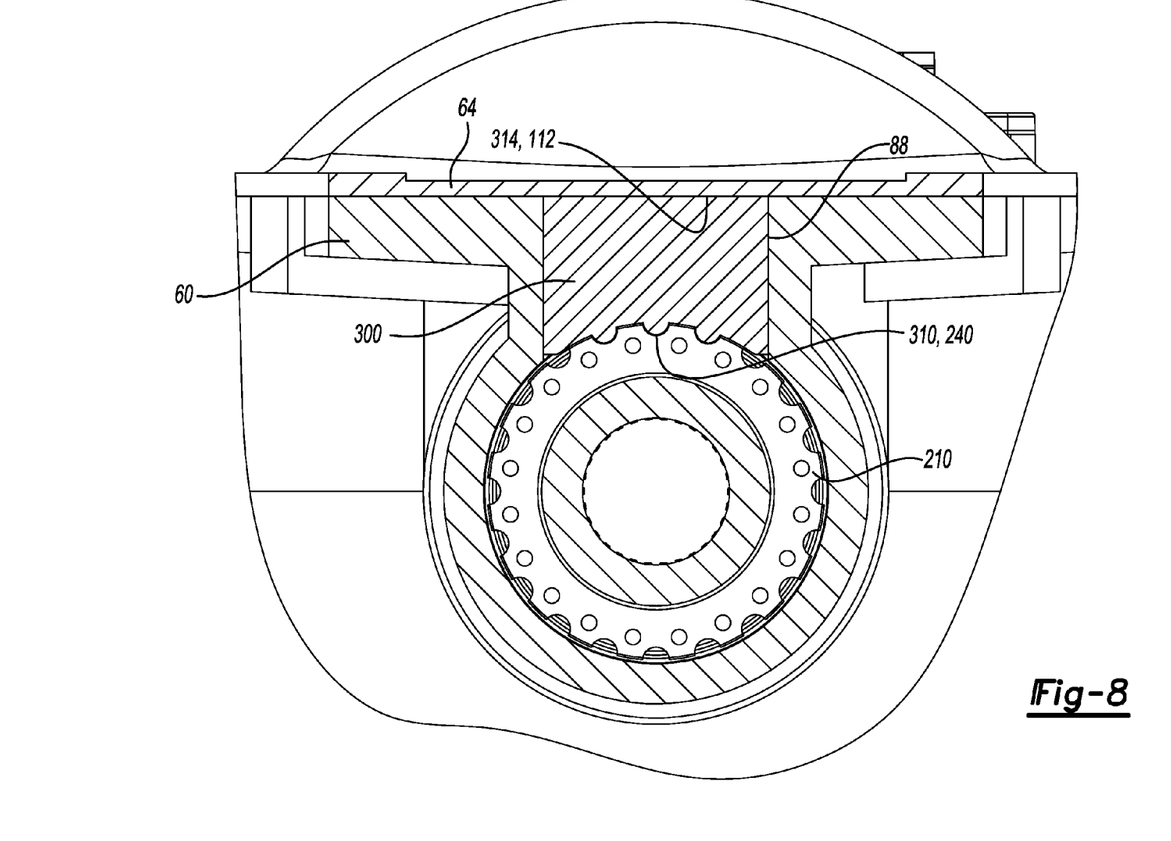
FIG. 8 is a section view of a portion of the rear axle assembly taken along the line 8-8 of FIG. 2.

With additional reference to FIG. 8, when the differential bearing adjusters 210 have been positioned so as to preload the differential bearings 162 to a desired degree and to position the differential assembly 54 and ring gear 56 laterally within the carrier housing 60 as desired, the adjuster locks 300 can be received into the lock mounts 88 so that the mating locking features 310 on the locking profile 304 can matingly engage the locking features 240 on the differential bearing adjusters 210. In situations where the differential bearing adjusters 210 are oriented relative to the carrier housing 60 such that the mating locking features 310 matingly engage the locking features 240, the outer ends 314 of the adjuster locks 300 can be spaced in a desired manner from the abutment members 112 such that the second flange 110 can be properly positioned relative to the first flange 86 (i.e., so that the housing cover 64 can be sealed against the carrier housing 60). In practice, a small amount of clearance can be disposed between the outer ends 314 of the adjuster locks 300 and the abutment members 112; the clearance, however, is relatively small so that the adjuster locks 300 cannot move relative to the differential bearing adjusters 210 and the housing cover 64 by an amount that is sufficient to permit the mating locking features 310 from disengaging the locking features 240. In situations where the differential bearing adjusters 210 are oriented relative to the carrier housing 60 such that the mating locking features 310 do not matingly engage the locking features 240, the outer ends 314 of the adjuster locks 300 can be spaced from the abutment members 112 such that the second flange 110 can be improperly positioned relative to the first flange 86 (i.e., so that the housing cover 64 cannot be sealed against the carrier housing 60). Construction in this manner permits the adjuster locks 300 to be "dropped into" the carrier housing 60 and eliminates the need for specific installation tools.

With renewed reference to FIG. 3, the height of the carrier housing 60 can be reduced by machining a plurality of surfaces 330 on the interior of the carrier housing 60 to ensure that there is clearance between the carrier housing 60 and the ring gear 56 and that the clearance is smaller in magnitude than would be possible to obtain in view of stack-up tolerances and conventional casting tolerances to control the location of the interior surfaces 330. In the example provided, the clearance between the interior surfaces 330 of the carrier housing 60 and the ring gear 56 is less than or equal to 2.0 mm (0.08 inch), preferably less than or equal to 1.5 mm (0.06 inch) and more preferably less than or equal to about 1.0 mm (0.04 inch).

With reference to FIG. 5, the locking mechanism 58 can comprise a first dog ring 350, a second dog ring 352, a plunger 354, a sleeve or lock collar 356 and an actuator assembly 358. The first and second dog rings 350 and 352 can be generally similar to the first and second dog rings described in detail in commonly assigned U.S. Pat. No. 7,425,185, the disclosure of which is incorporated by reference as if fully set forth in detail herein. Briefly, the first dog ring 350 can comprise a plurality of first face teeth formed on a surface of the second helical side gear 182 that faces the cap 142, while the second dog ring 352 can be disposed between the first dog ring 350 and the cap 142 and can have a plurality of second face teeth and a plurality of locking members 360 that can be received into locking recesses 362 that can be formed through the cap 142. The locking members 360 engage the cap 142 so as to axially slidably but non-rotatably couple the second dog ring 352 to the cap 142. It will be appreciated that engagement of the second face teeth to the first face teeth non-rotatably couples the second helical side gear 182 to the differential case assembly 130 to thereby lock the power transmitting means 134 and inhibit speed/torque differentiation between the output members 132. The plunger 354 can comprise a plurality of legs 370 and a plunger body 372. Each of the legs 370 can be a pin-shaped structure that can be axially slidably received in one of the locking recesses 362 in the cap 142 and abutted against one of the locking members 360. The plunger body 372 can be fixedly coupled to the legs 370 and to the second dog ring 352. In the example provided, the plunger body 372 is formed of a metallic ring and a plastic material that is overmolded onto (i.e., cohesively bonded to) the metallic ring, the legs 370 and the locking members 360 on the second dog ring 352. The legs 370 can be moved within the locking recesses 362 to position the second dog ring 352 in a first position, in which the second face teeth are spaced apart from the first face teeth so that rotation of the second helical side gear 182 relative to the cap 142 is not restricted, and a second position in which the second face teeth are engaged to the first face teeth inhibit rotation of the second helical side gear 182 relative to the cap 142.

With reference to FIGS. 3 and 5, the lock collar 356 can be mounted to the differential case, such as to the cap 142, and can be coupled to the differential case for common rotation. In the particular example provided, the lock collar 356 is non-rotatably coupled to the cap 142 and axially movable along the second axis 98 between a first sleeve position and a second sleeve position. In the particular example provided, the cap 142 defines a plurality of longitudinally extending ridges 380 and the lock collar 356 is matingly contoured so as to slide along the ridges 380 but not rotate relative to the cap 142. The lock collar 356 can comprise an engagement surface 384, which can be fixedly coupled to the legs 370 of the plunger 354, and a circumferential groove 386.

The actuator assembly 358 can be similar to the actuator assembly described in co-pending and commonly assigned U.S. Provisional Patent Application No. 61/869,282 filed Aug. 23, 2013 entitled "Power Transmitting Component With Twin-Fork Actuator", the disclosure of which is incorporated by reference as if fully set forth in detail herein. Briefly, the actuator assembly 358 can comprise an actuator housing 400, a motor 402, a transmission 404, a lead screw (not specifically shown), a cradle rail 408, a fork rail (not specifically shown), a cradle assembly 412, a clutch fork 414, and a biasing spring (not specifically shown). The actuator housing 400 is configured to at least partly house the remaining components of the actuator assembly 358 and can be mounted to the mounting flange 118 (FIG. 3) of the actuator mount 114 (FIG. 3) to close the actuator aperture 120 (FIG. 3). The motor 402 can be an electric motor that can drive the lead screw through the transmission 404. The cradle rail 408 and the fork rail can be fixedly coupled to actuator housing 400 and can be disposed generally parallel to a rotational and longitudinal axis of the lead screw. The cradle assembly 412 can be threadably coupled to the lead screw and can include a cradle and a compliance spring. The cradle can be slidably mounted on the cradle rail 408 and the fork rail. The compliance spring can be disposed between the cradle and the lead screw and can be configured to permit axial movement of the compliance spring relative to the cradle in at least one direction. The clutch fork 414 can be slidably mounted on the fork rail and can include a pair of arms 420 that can be received into the circumferential groove 386 in the lock collar 356. The biasing spring can be disposed on the fork rail between the clutch fork 414 and the cradle. The biasing spring can bias the clutch fork 414 along the fork rail in a predetermined direction relative to the cradle assembly 412.

In operation, the motor 402 can be operated to drive the lead screw to cause corresponding motion of the cradle assembly 412 along the fork rail. Motion of the cradle assembly 412 in a first direction along the fork rail can cause corresponding motion of the clutch fork 414, which can drive the lock collar 356 (and thereby the plunger 354 and the second dog ring 352) toward the second sleeve position such that the second dog ring 352 is moved toward its second position. In the event that motion of the clutch fork 414 in the first direction is halted due to tooth-on-tooth contact of the second face teeth with the first face teeth, the biasing spring can be compressed to permit the cradle assembly 412 to be positioned and to exert a force onto the clutch fork 414 that causes the clutch fork 414 to move in the first direction (to cause driving engagement of the second face teeth with the first face teeth) when the first face teeth have been positioned rotationally relative to the second face teeth in a manner that permits the second dog ring 352 to shift fully against the first dog ring 350.

Motion of the cradle assembly 412 in a second, opposite direction along the fork rail can cause corresponding motion of the clutch fork 414, which can drive the lock collar 356 toward the first sleeve position (and thereby the plunger 354 and the second dog ring 352) such that the second dog ring 352 is moved toward its first position. In the event that motion of the clutch fork 414 in the second direction is halted due to torque-locking of the second face teeth with the first face teeth, the compliance spring can be compressed to permit the cradle to be positioned and to exert a force onto the clutch fork 414 that causes the clutch fork 414 to move in the second direction (to cause disengagement of the second face teeth from the first face teeth).

It will be appreciated that the configuration of the bearing adjusters 210 that is depicted herein permits the carrier housing 60 to be relatively narrow in its width. For example, the locking collar 356 can be disposed concentrically about one of the differential bearings 162 so that the rear axle assembly 36 can be provided with locking capabilities without a corresponding need to widen the carrier housing 60. In this regard, at least a portion of the locking collar 356 can be radially in-line with at least a portion of one of the differential bearings 162 when the locking collar 356 is in at least one of the first and second sleeve positions such that a plane P taken perpendicular to the second axis 98 extends through both the locking collar 356 and one of the differential bearings 162.

With renewed reference to FIGS. 1 and 3, many of the components of the particular rear axle assembly 36 described herein and illustrated in the accompanying drawings are configured such that they can also be employed in the front axle assembly 40. Those of skill in the art will appreciate that because the output members 132 of the differential assembly 54 must rotate in a common rotational direction, the orientation of the carrier housing 60 must be rotated 180 degrees about (i.e., mirrored about) the second axis 98 and can optionally be rotated 180 degrees about (i.e., mirrored about) the first axis 94. In the particular example provided, the carrier housing 60 is mirrored about both the first and second axes 94 and 98. Configuration in this manner orients the input pinion 52 so as to receive rotary power from the transfer case 32, as well as causes the meshing of the input pinion 52 and the ring gear 56 to occur on an opposite lateral side of the first axis 94. Configuration in this manner also causes the ring gears 56 of the rear and front axle assemblies 36 and 40 to rotate in opposite rotational directions (relative to the carrier housing 60). This latter point is significant because the ring gear 56 of the rear axle assembly 36 is employed to provide lubrication to the pinion bearings 92 via sling lubrication. Sling lubrication involves the rotation of the ring gear 56 through a lubricant-containing sump in the carrier housing 60 and the subsequent outward slinging of the lubricant from the ring gear 56 due to centrifugal force when the ring gear 56 rotates in a predetermined rotational direction (which corresponds to operation of the vehicle in a predetermined, e.g., forward, direction). Typically, lubricant slung from a ring gear 56 can be directed via lubricant galleries in a desired manner to lubricate various bearings within the rear axle assembly 36. When the rotational direction of the ring gear 56 relative to the carrier housing 60 is changed, however, the lubricant slung from the ring gear 56 will travel in a different direction relative to the carrier housing 60. Accordingly, we have configured the carrier housing 60 with alternate lubrication galleries for providing lubricant to the pinion bearings 92 when the carrier housing 60 is oriented differently (e.g., mirrored about the first and second axes 94 and 98). Those of skill in the art will appreciate that in a situation where the carrier housing 60 is mirrored about the first and second axes 94 and 98, contact between the input pinion 52 and the ring gear 56 will additionally interfere with the slinging of lubrication when the vehicle is operated in the predetermined direction.

Figures 9, 10:
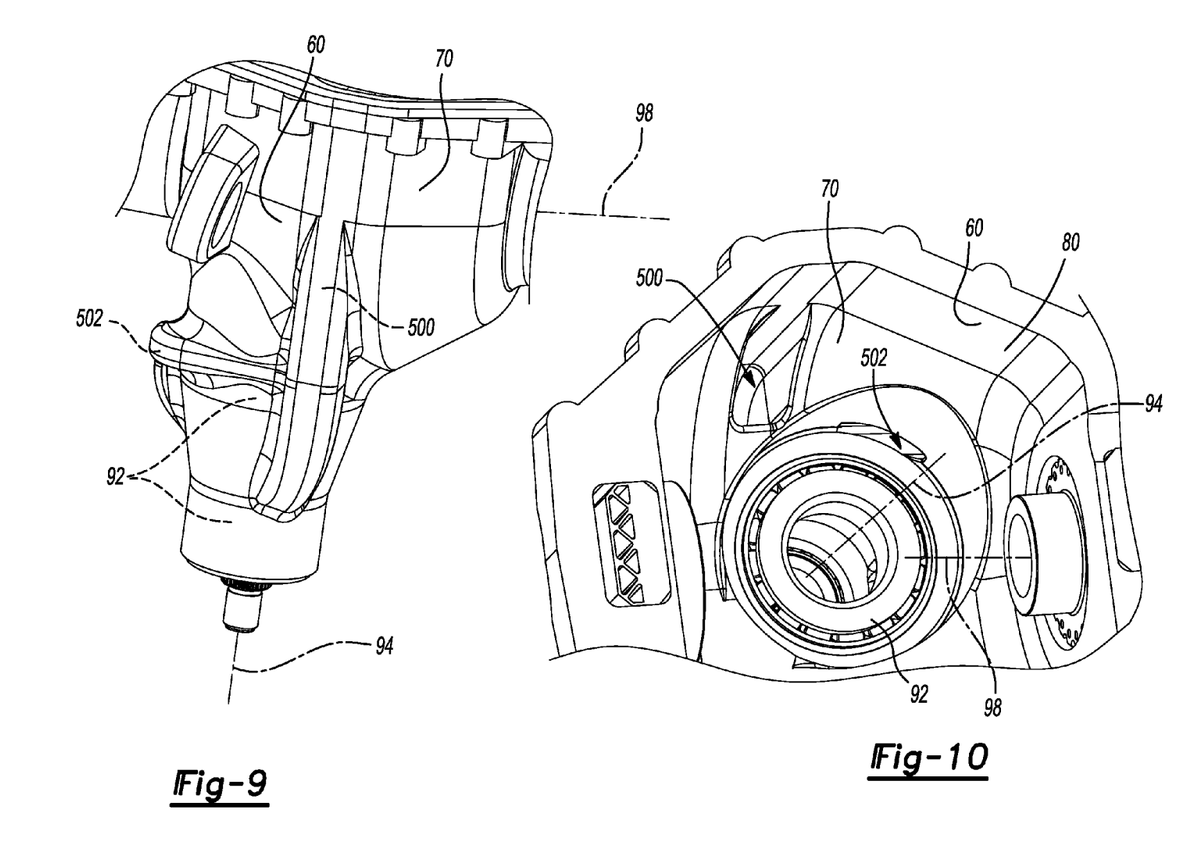
FIG. 9 is a top perspective view of a portion of the rear axle assembly, illustrating a portion of a carrier housing in more detail.
FIG. 10 is a perspective of a portion of the rear axle assembly, illustrating a portion of the interior of the carrier housing in more detail.
Figure 11:
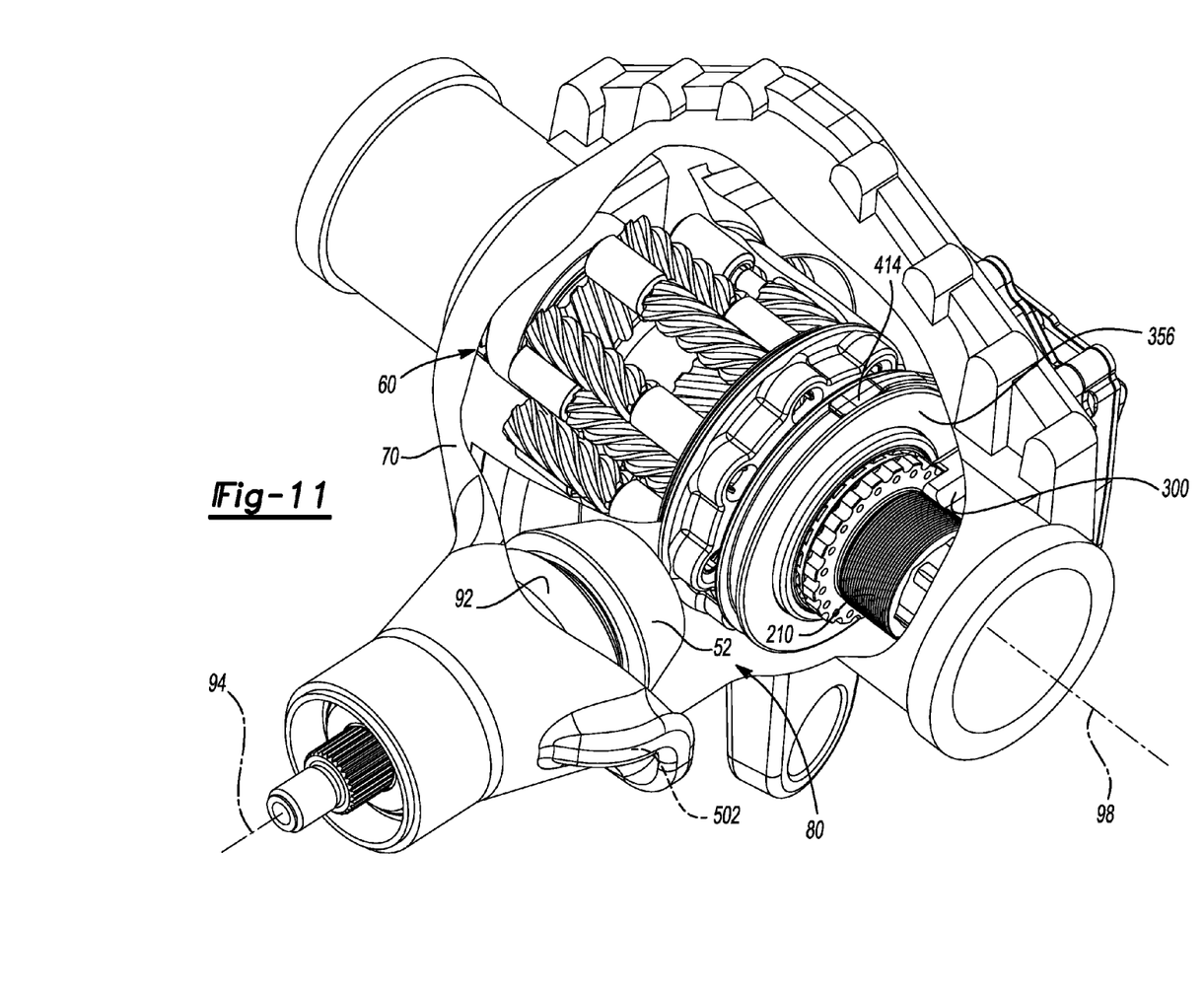
FIG. 11 is a perspective, partly broken-away view of a bottom portion of the rear axle assembly.

With reference to FIGS. 9 through 11, the body portion 70 of the carrier housing 60 can define a first lubricant gallery 500 and a second lubricant gallery 502. Optionally, the structure that forms the first lubricant gallery 500 and/or the structure that forms the second lubricant gallery 502 can be employed to strengthen portions of the carrier housing 60. In the particular example provided, the structures that form the first and second lubricant galleries 500 and 502 form ribs on the exterior of the remainder of the carrier housing 60 that strengthen desired portions of the carrier housing 60. For example, the structure that forms the second lubricant gallery 502 is configured to support the portion of the carrier housing 60 that is loaded by the input pinion 50 during operation of the axle assembly when the vehicle is operated in a predetermined (e.g., forward) direction.

The first lubricant gallery 500 can define a channel that extends between the cavity 80 and the portion of the carrier housing 60 to which the pinion bearings 92 (FIG. 2) are mounted. The end of the first lubricant gallery 500 that intersects the cavity 80 can be oriented to receive lubricant that is slung from the ring gear 56 (FIG. 3) when the carrier housing 60 is used for the rear axle assembly 36 (FIG. 1) and the vehicle 10 (FIG. 1) is operated in a forward direction. Accordingly, the end of the first lubricant gallery 500 that interests the cavity 80 can be oriented vertically above the second axis 98 (FIG. 5). The first lubricant gallery 500 can be sloped so as to drop vertically with decreasing distance toward the pinion bearings 92 (FIG. 3) when the carrier housing 60 is oriented for use in the rear axle assembly 36 (FIG. 1). Configuration in this manner permits the first lubricant gallery 500 to be employed to feed (via gravity) lubricant from the cavity 80 to the pinion bearings 92 (FIG. 3) when the carrier housing 60 is oriented for use in the rear axle assembly 36 (FIG. 1). When the carrier housing 60 is mirrored about the first and second axes 94 and 98 for use in the front axle assembly 40 (FIG. 1), the first lubricant gallery 500 is configured to drain excess lubricant from the pinion bearings 92 (FIG. 3) to the cavity 80.

The second lubricant gallery 502 can define a channel that extends between the cavity 80 and the portion of the carrier housing 60 to which the pinion bearings 92 (FIG. 2) are mounted. The end of the second lubricant gallery 502 that intersects the cavity 80 can be oriented to receive lubricant that is slung from the gear portion of the input pinion 52 (FIG. 3) when the carrier housing 60 is used for the front axle assembly 40 (FIG. 1) and the vehicle 10 (FIG. 1) is operated in a forward direction. Accordingly, the end of the second lubricant gallery 502 that interests the cavity 80 can be oriented vertically below the end of the first lubricant gallery 500 that intersects the cavity 80 and on a side of the first axis 94 that is opposite the end of the first lubricant gallery 500 that intersects the cavity 80. When the carrier housing 60 is oriented for use in the rear axle assembly 36 (FIG. 1), the second lubricant gallery 502 can be configured to drain excess lubricant from the first lubricant gallery 500 and moreover, can be positioned to drain lubricant onto the gear portion of the input pinion 52. When the carrier housing 60 is oriented for use in the front axle assembly 40 (FIG. 1), lubricant can be slung from the gear portion of the input pinion 52 and can be received into the end of the second lubricant gallery 502 that intersects the cavity 80; excess lubricant can drain to the cavity 80 through the open end of the first lubricant gallery 500.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
   a locking differential assembly having a differential case, a ring gear coupled to the differential case for rotation therewith, first and second output members, and a locking element that is movably mounted to the differential case;
   an axle housing having a center section that defines a pinion mount portion, a cavity, an opening and a first flange that borders the opening, the opening being sized to admit the locking differential assembly there through, the locking differential assembly being received in the cavity for rotation about an axis, the ring gear extending through the opening, the flange defining a sealing surface that is parallel to and offset from the axis;
   an input pinion received in the pinion mount portion, the input pinion having a stem and a pinion, the pinion being disposed in the cavity;
   a pair of pinion bearings received in the pinion mount portion and supporting the stem for rotation relative to the center section;
   a cover mounted to the flange to partly close an open side of the cavity, the cover defining an actuator aperture that provides access through the cover to the cavity; and
   an actuator assembly comprising a sleeve and an actuator, the sleeve being mounted on the differential case and movable along the axis between a first sleeve position and a second sleeve position, the actuator being mounted to an exterior side of the cover and extending through the actuator aperture to engage the sleeve, the actuator being configured to selectively move the sleeve between the first and second sleeve positions, wherein the locking differential assembly is configured to operate in an unlocked mode that permits speed differentiation between the first and second output members when the sleeve is in the first sleeve position, and wherein the locking differential assembly is configured to be operated in a locked mode that inhibits speed differentiation between the first and second output members when the sleeve is in the second sleeve position.

2. The axle assembly of claim 1, wherein the actuator comprises a fork that engages the sleeve.

3. The axle assembly of claim 1, wherein the sleeve is coupled to the differential case for common rotation.

4. The axle assembly of claim 1, wherein the locking differential assembly is supported for rotation relative to the center section of the axle housing by a pair of differential bearings and wherein at least a portion of the sleeve is radially in-line with at least a portion of one of the differential bearings when the sleeve is in the first sleeve position.

5. The axle assembly of claim 4, wherein the differential case defines a bearing bore and wherein the one of the differential bearings comprises an outer bearing race that is received in the bearing bore and engaged to the differential case.

6. The axle assembly of claim 5, wherein a radially inner side of the one of the differential bearings is supported on a bearing adjuster that is movably mounted to the center section of the axle housing.

7. The axle assembly of claim 6, wherein the bearing adjuster is threadably engaged to the center section.

8. The axle assembly of claim 1, wherein each of the first and second output members is coupled to a side gear for common rotation.

9. The axle assembly of claim 1, wherein the locking differential comprises a differential gearset having a pair of side gears and a plurality of differential pinions.

10. The axle assembly of claim 9, wherein the differential gearset is a helical gearset.

11. An axle assembly comprising:
    an axle housing having a center section that defines a cavity;
    a locking differential assembly received in the cavity, the locking differential assembly having a differential case, first and second output members, and a locking element that is movably mounted to the differential case, the differential case defining a bearing bore;
    a differential bearing having an outer bearing race, the outer bearing race being received in the bearing bore and engaged to the differential case, the differential bearing supporting an end of the locking differential assembly for rotation about an axis relative to the axle housing, the differential bearing having a thrust pre-load directed between the axle housing and the differential case in a predetermined direction along the axis; and
    an actuator assembly having a sleeve and an actuator, the sleeve being mounted on the differential case and movable along the axis between a first sleeve position and a second sleeve position, the actuator being coupled to the axle housing and engaging the sleeve, the actuator being configured to selectively move the sleeve between the first and second sleeve positions, wherein the locking differential assembly is configured to operate in an unlocked mode that permits speed differentiation between the first and second output members when the sleeve is in the first sleeve position, wherein the locking differential assembly is configured to operate in a locked mode that inhibits speed differentiation between the first and second output members when the sleeve is in the second sleeve position and wherein at least a portion of the sleeve is radially in-line with at least a portion of the differential bearing when the sleeve is in at least one of the first and second sleeve positions such that a plane taken perpendicular to the axis extends through both the sleeve and the differential bearing.

12. The axle assembly of claim 11, wherein the actuator comprises a fork that engages the sleeve.

13. The axle assembly of claim 11, wherein the sleeve is coupled to the differential case for common rotation.

14. The axle assembly of claim 11, wherein a plurality of legs are mounted to the locking element, the legs extending through the differential case and disposed in a force transmission path in which force is transmitted between the sleeve and the locking element.

15. The axle assembly of claim 11, wherein a radially inner side of the differential bearing is supported on a bearing adjuster that is movably mounted to the center section of the axle housing.

16. The axle assembly of claim 15, wherein the bearing adjuster is threadably engaged to the center section.

17. The axle assembly of claim 11, wherein each of the first and second output members is coupled to a side gear for common rotation.

18. The axle assembly of claim 11, wherein the locking differential comprises a differential gearset having a pair of side gears and a plurality of differential pinions.

19. The axle assembly of claim 18, wherein the differential gearset is a helical gearset.

\* \* \* \* \*